United States Patent [19]
Gähwiler

[11] 3,854,088
[45] Dec. 10, 1974

[54] COUNTING AND ANALYSIS APPARATUS FOR PARTICLES SUSPENDED IN AN ELECTROLYTIC LIQUID

[75] Inventor: Hermann Gähwiler, Zurich, Switzerland

[73] Assignee: Contraves AG, Zurich, Switzerland

[22] Filed: Nov. 12, 1973

[21] Appl. No.: 414,839

[30] Foreign Application Priority Data
Nov. 30, 1972  Switzerland.................. 17483/72

[52] U.S. Cl. ........................................... 324/71 CP
[51] Int. Cl. ........................................... G01n 27/00
[58] Field of Search ............................... 324/71 CP

[56] References Cited
UNITED STATES PATENTS
3,299,354   1/1967   Hogg ........................... 324/71 CP
FOREIGN PATENTS OR APPLICATIONS
274,474   6/1970   U.S.S.R. ......................... 324/71 CP Primary Examiner—Alfred E. Smith
Assistant Examiner—Rolf Hille
Attorney, Agent, or Firm—Werner W. Kleeman

[57] ABSTRACT

A counting- and analysis apparatus for particles suspended in an electrolytic liquid, wherein the suspension flows through a bore having a predetermined diameter and functioning as an electrical resistance measurement path or aperture. A respective electrode is arranged at each side of the measurement path and there is provided a connection conduit from the space in front of the measurement path to a sample container. A direct current supply electrode is arranged in the sample container in such a manner that the gas bubbles which are formed thereat do not arrive in the connection conduit and that at least in the compartment or space in front of the measurement path there is provided an auxiliary electrode for tapping-off the voltage fluctuations which are generated during passage of the particles through the aperture or measurement path.

6 Claims, 2 Drawing Figures

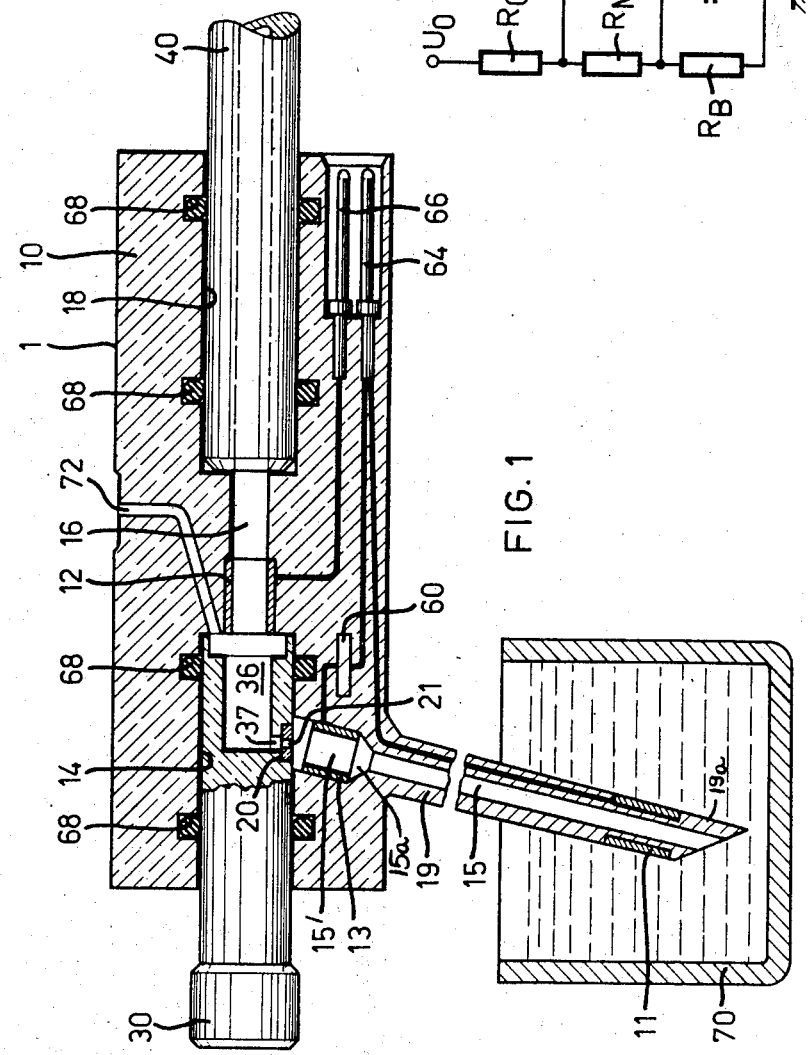

COUNTING AND ANALYSIS APPARATUS FOR PARTICLES SUSPENDED IN AN ELECTROLYTIC LIQUID

BACKGROUND OF THE INVENTION

The present invention relates to a new and improved construction of counting- and analysis apparatus for particles suspended in an electrolytic liquid, wherein the suspension flows through a bore having a predetermined diameter and functioning as an electrical resistance measurement path or aperture, with a respective electrode arranged at each side of such measurement path or aperture and there being furthermore provided a connection conduit from the space or compartment in front of the measurement path to a sample container or vessel.

In the commonly assigned U.S. Pat. No. 3,648,158, the disclosure of which is incorporated herein by reference, there is disclosed such type of counting system and especially apparatus for measuring electrical conductivity, a so-called conductivity cell or measuring head. With such conductivity cell a respective electrode is arranged in a compartment directly before and after the measurement path or aperture in a portion of the conductivity cell constructed as an electrode support. As experience has shown, the measurement current cannot exceed about 150 microamperes since the gas formed by electrolysis no longer can be dissolved and the formed gas bubbles disturb the measurement operation. This is particularly the case for those gas bubbles which are formed at the electrode in front of the aperture of measurement path, and which gas bubbles upon passage through the aperture can produce an erroneous particle counting operation or clogging of the aperture.

SUMMARY OF THE INVENTION

Hence, it is a primary object of the present invention to provide an improved construction of counting- and analysis apparatus for particles suspended in an electrolytic liquid which is not associated with the aforementioned drawbacks and limitations of the prior art constructions.

Another and more specific object of the present invention resides in increasing the measurement current and thus the sensitivity of the conductivity-measuring apparatus while avoiding the previously discussed drawbacks.

Still a further significant object of the present invention relates to an improved construction of particle counting system which is extremely simple in design, highly reliable in operation, and provides an accurate particle count.

Yet a further significant object of the present invention relates to an improved construction of counting- and analysis apparatus for particles suspended in an electrolytic liquid sample and incorporating means for ensuring that any gas bubbles which are formed will not detrimentally affect the particle counting operation.

Now in order to implement these and still further objects of the invention, which will become more readily apparent as the description proceeds, the invention contemplates the provision of a direct-current supply electrode which is arranged in the sample container such that the gas bubbles which are formed thereat do not reach the connection conduit, and that at least in the compartment or space in front of the aperture or measurement path there is provided an auxiliary electrode for tapping-off the voltage fluctuations which are produced during passage of the particles through the aperture or measurement path.

According to a particularly advantageous constructional embodiment of the invention, a substantially ring-shaped direct-current supply electrode is applied to the external tip of a hollow suction needle provided at the conductivity cell. A further advantageous aspect of the invention contemplates connecting the auxiliary electrode with the aforementioned ring-shaped direct-current supply electrode through the agency of an alternating current shorting or short-circuiting capacitor.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 is a cross-sectional view through a conductivity cell and a sample container of a counting- and analysis apparatus designed according to the invention; and FIG. 2 is an electrical equivalent circuit diagram of the conductivity measurement circuit.

DETAILED DESCRIPTION OF THE PREFERRED EMBODIMENTS

Describing now the drawing, in FIG. 1 there is depicted an electrode arrangement according to the invention of a counting-and analysis apparatus or system for particles suspended in a liquid, for instance according to the previously mentioned U.S Pat. No. 3,648,158. A conductivity cell or measuring head 1 encompasses a substantially cylindrical-shaped electrode support 10 and a likewise substantially cylindrical-shaped aperture support or measurement path support 30 which is sealingly inserted in the electrode support 10. The electrode support 10 and the aperture support 30 are formed for instance of transparent plastic. A hollow suction needle 19 defining a connection conduit or line extends radially from the electrode support 10 with its suction channel 15 into a liquid sample container or flask 70. A direct-current supply electrode 11 is arranged in a ring-shaped manner at the region of the outer tip 19a of the hollow suction needle 19. Also arranged in the electrode support 10 is a coaxial suction channel 16 which is equipped at both ends with a respective substantially cylindrical widened portion 14 and 18. An electrode 12 is inserted in the suction channel 16, as shown. Further arranged at the electrode support 10 is a compartment or space 15' which is located at the mouth or opening 15a of the suction channel 15 into the widened portion 14 and containing a substantially tubular-shaped auxiliary electrode 13, a capacitor 60 and two electrical connection pins or connectors 64 and 66.

The capacitor 60 is electrically coupled on the one hand with the auxiliary electrode 13 and on the other hand with the connection pin 64, with which there is also connected the direct-current supply electrode 11. The electrode 12 is electrically coupled with the connection pin or connector 66. The widened portion 18 together with both of the sealing rings 68 inserted therein serve the purpose of sealingly receiving a measurement tube 40 of a not particularly illustrated volume metering device, for instance of the type disclosed in the aforementioned United States patent and also the commonly assigned U.S. Pat. No. 3,577,162, the disclosure of which is likewise incorporated herein by reference. The two sealing rings 68 which are inserted into the widened portion 14 are each arranged to one side of the mouth or opening 15a of the suction channel 15 and the compartment 15' respectively. The aperture support 30 which is sealingly inserted into the widened portion 14 axially contains a blindhole bore 36 which constitutes an extension of the suction channel 16, a channel 37 which radially leads into the blindhole bore 36 and serves as an extension of the suction channel 15 and a measurement path element or better known in the art an aperture 20 which is sealingly inserted in the channel 37, for instance a ruby, having a bore 21 possessing a predetermined diameter and serving as the electrical resistance measuring path, as is well known in this particular art.

As is described in the aforementioned U.S. Pat. No. 3,648,158, during each measurement operation a quantity of suspension which is determined by the volume metering system is sucked-up by means of any suitable and therefore not particularly illustrated suction pump out of the sample container or flask through the suction channel 15, the bore 21 in the aperture 20, the channel 37, the blindhole bore 36 and the suction channel 16 into the volume measurement tube 40. Counting of the particles which are suspended in the electrolytic liquid, and which particles however possess an electrical conductivity which differs from that of the electrolytic liquid, occurs in such a manner that the electrodes 11 and 12 are connected with a direct-current source and the electrical changes in resistance, which are produced during passage of a particle through the bore 21, between the electrodes 12 and 13 is ascertained by such electrodes and transmitted in the form of an appropriate electrical signal to a suitable and therefore not particularly illustrated amplifier- and counting circuit, as is known in this particular art, and for instance as disclosed in the aforementioned, commonly assigned U.S. Pat. No. 3,577,162. Each counting operation is terminated in that, among other things, a non-illustrated device now opens the gas channel which up to then was closed and then under the action of the suction pump the suspension in the blindhole bore 36, in the suction channel 16, and in the volume measuring tube 40, is sucked-off and replaced by air.

According to the arrangement depicted in FIGS. 1 and 2, the supply resistance $R_0$ and, through the agency of the connection pins 66 and 64, i.e., both of the electrodes 12 and 11, the suspension resistance $R_M + R_B$ are connected with a direct-current voltage $U_O$. As the measurement path resistance $R_M$ there is designated the electrical resistance of the suspension between the electrodes 12 and 13. The path resistance $R_B$ is constituted by the electrical resistance of the suspension column between the electrodes 13 and 11. By placing the direct-current supply electrode 11, which in the system of the previously mentioned U.S. Pat. No. 3,648,158, was arranged in the compartment or space 15', in the sample container or flask 70, i.e., at the region of the outer tip of the hollow suction needle 19, it is possible to increase by about a factor of 5 to 10 the measurement direct-current, since now the gas bubbles which are produced by electrolysis can freely escape towards the top without penetrating into the suction channel 15. The use of only this one electrode 11 in front of the measurement path or aperture 20 according to the previous proposals in the art is associated with the following problems:

The volume of the suction channel 15 in front of the measurement path or aperture 20 must be maintained as small as possible owing to the danger of admixing of the sample, however the length of the path between the sample container or flask 70 and the measurement path or aperture 20 must be relatively large for constructional reasons and for other reasons concerning the advantageous operation of the system. Thus, owing to the arrangement of the direct-current voltage supply electrode 11 in the sample container 70, there exists a relatively higher additional path resistance $R_B$, which can amount to up to about 3 times the measurement path resistance $R_M$ which amounts to for instance 15 kiloohms. The internal resistance of the signal source ($R_M + R_B$) is thus markedly increased, leading to the following drawbacks: increase of the source noise, less signal yield for given supply resistance $R_O$, for instance 100 kiloohms, increased disturbance sensitivity with respect to the penetration of external disturbing fields, lowering of the upper boundary frequency for a given stray capacitance and increase of the supply voltage $U_O$. If the auxiliary electrode 13 is arranged directly in front of the measurement path or aperture in the compartment or space 15' and such electrically connected through the agency of a capacitor 60, for instance possessing a capacitance of 0.1 microfarads, with the direct-current supply electrode 11, i.e., the connection pin 64, with the result that the path resistance $R_B$ is alternating-current short-circuited, then the previously enumerated drawbacks are eliminated, however, with the exception of the requirement for a higher supply voltage $U_O$.

With such electrode arrangement at the conductivity cell 1, it is now possible for the voltage fluctuations Δ U generated during the passage of particles through the measurement path or aperture 20 to be tapped-off or removed by both of the electrodes 13 and 12 which are directly arranged before and after the measurement path and transmitted to the counting device or counter without the previously mentioned disturbing influences. The three electrodes 11, 12 and 13 are in this case arranged in a proper functional manner, so that the gas bubbles which are formed by the direct-current electrolysis at the direct-current supply electrode 11 cannot arrive in front of the measurement path, the gas bubbles developed at the direct-current voltage supply electrode 12 are negligible in terms of the volume metering function and at the alternating-current operated auxiliary electrode 13 there are not formed any gas bubbles. With the aid of the alternating-current shorting element 60 there are also not present the considerable drawbacks of the high path resistance $R_B$ when using a relatively high measurement direct-current.

Without any particular advantage it would be also possible to divide the electrode 12 into an alternating current- and a direct-current supply electrode and/or to use in place of the capacitor 60 also a differential amplifier.

While there is shown and described present preferred embodiments of the invention, it is to be distinctly understood that the invention is not limited thereto, but

What is claimed is:

1. A counting- and analysis apparatus for particles suspended in an electrolytic liquid, comprising a sample container for the liquid, a conductivity cell, said conductivity cell being provided with means defining a bore having a predetermined diameter and serving as an electrical resistance measurement path through which flows the suspension, a respective electrode arranged to each side of said measurement path, said conductivity cell including a compartment arranged in front of the measurement path, a connection conduit leading from said compartment in front of said measurement path to said sample container, one of said respective electrodes comprising a direct-current supply electrode carried by the connection conduit and arranged in the sample container such that the gas bubbles formed thereat do not enter the connection conduit, and an auxiliary electrode arranged at least in the compartment in front of the measurement path for tapping-off the voltage fluctuations which are generated during passage of the particles through the measurement path.

2. The counting- and analysis apparatus as defined in claim 1, wherein said connection conduit incorporates a hollow suction needle provided for the conductivity cell and extending into the sample container, said hollow suction needle incorporating a tip, and said direct-current supply electrode being arranged in a ring-shaped manner at the outside of the region of the tip of the hollow suction needle.

3. The counting- and analysis apparatus as defined in claim 1, further including an alternating-current shorting and direct-current suppressing element for connecting the auxiliary electrode with the direct-current supply electrode.

4. The counting- and analysis apparatus as defined in claim 3, wherein said element is a capacitor.

5. The counting- and analysis apparatus as defined in claim 4, wherein said conductivity cell contains the direct-current supply electrode, the auxiliary electrode, an electrode defining the other of said respective electrodes arranged after the measurement path, the capacitor and its electrical connection lines and terminals.

6. In a counting- and analysis apparatus for particles suspended in an electrolytic liquid, comprising a sample container for the liquid, a conductivity cell, said conductivity cell being provided with means defining a bore having a predetermined diameter and serving as an electrical resistance measurement path through which flows the suspension, said conductivity cell including a compartment arranged in front of the measurement path, a connection conduit leading from said compartment in front of said measurement path to said sample container, the improvement comprising a direct-current supply electrode means arranged at the connection conduit in the sample container for preventing gas bubbles formed thereat from reaching the interior of the connection conduit, and an auxiliary electrode means arranged in front of the measurement path for removing voltage fluctuations generated during passage of the particles through the measurement path.

* * * * *